(12) United States Patent
Szuba

(10) Patent No.: US 8,499,600 B2
(45) Date of Patent: Aug. 6, 2013

(54) CLUTCH ASSEMBLY WITH FORMED RETENTION RING

(75) Inventor: Joseph Szuba, Dearborn, MI (US)

(73) Assignees: Value Extraction LLC, Dearborn, MI (US); Szuba Consulting, Inc., Dearborn, MI (US)

( * ) Notice: Subject to any disclaimer, the term of this patent is extended or adjusted under 35 U.S.C. 154(b) by 0 days.

(21) Appl. No.: 13/540,201

(22) Filed: Jul. 2, 2012

(65) Prior Publication Data

US 2012/0272503 A1 Nov. 1, 2012

Related U.S. Application Data

(63) Continuation of application No. 13/153,869, filed on Jun. 6, 2011, now Pat. No. 8,240,446.

(60) Provisional application No. 61/351,311, filed on Jun. 4, 2010.

(51) Int. Cl.
*B21D 5/00* (2006.01)
*B21D 15/02* (2006.01)
*B21D 39/00* (2006.01)
*B21D 53/88* (2006.01)

(52) U.S. Cl.
USPC .............. 72/83; 72/379.2; 29/522.1; 29/897.2

(58) Field of Classification Search
USPC ................... 72/82–85, 102, 107, 110, 70, 71, 72/379.2; 29/522.1, 897.2, 893.2
See application file for complete search history.

(56) References Cited

U.S. PATENT DOCUMENTS

| 1,562,419 | A | * | 11/1925 | Bowen | ....................... 219/150 R |
| 3,279,835 | A | | 10/1966 | Krohm | |
| 4,014,619 | A | | 3/1977 | Good et al. | |
| 4,089,097 | A | | 5/1978 | Good et al. | |
| 4,705,150 | A | * | 11/1987 | Hill | ............................... 192/70.2 |
| 5,180,043 | A | | 1/1993 | Walker | |
| 5,305,943 | A | | 4/1994 | Walker | |
| 5,577,582 | A | * | 11/1996 | Lindsay | ..................... 192/70.19 |
| 5,881,856 | A | | 3/1999 | Prater | |
| 5,893,704 | A | | 4/1999 | Prater | |

(Continued)

FOREIGN PATENT DOCUMENTS

| JP | H09-053674 A | 2/1997 |
| WO | 2006104916 A3 | 10/2006 |

OTHER PUBLICATIONS

PCT/US11/49930 International Search Report dated Jan. 10, 2012, 2 pages.

(Continued)

*Primary Examiner* — Dana Ross
*Assistant Examiner* — Lawrence Averick
(74) *Attorney, Agent, or Firm* — Warner Norcross & Judd LLP

(57) ABSTRACT

A clutch assembly for a vehicle transmission includes a housing defined by a wall having an annular configuration circumscribing a clutch axis. The wall extends between an open end and a floor. The floor extends inwardly from the wall toward the clutch axis. A plurality of splines formed in the wall and each is spaced from the open end of the housing. A snap ring retains clutch plates in the housing. The open end of the wall is deformed inwardly toward the clutch axis defining a retainer for retaining the snap ring within the housing.

10 Claims, 5 Drawing Sheets

U.S. PATENT DOCUMENTS

| | | |
|---|---|---|
| 5,896,970 A | 4/1999 | Prater |
| 5,906,135 A | 5/1999 | Prater |
| 6,035,737 A | 3/2000 | Prater |
| 6,058,591 A | 5/2000 | Prater |
| 6,158,265 A | 12/2000 | Prater |
| 6,691,542 B2 * | 2/2004 | Fukukawa et al. .............. 72/84 |
| 6,755,746 B2 | 6/2004 | Barnley et al. |
| 6,776,274 B2 | 8/2004 | Prater |
| 6,920,970 B1 | 7/2005 | Dumas |
| 6,945,086 B2 | 9/2005 | Prater |
| 7,243,770 B2 | 7/2007 | Prater |
| 2004/0261247 A1 * | 12/2004 | Prater ........................ 29/557 |
| 2010/0044179 A1 | 2/2010 | Nakamura et al. |

OTHER PUBLICATIONS

PCT/US11/49930 Written Opinion of the International Searching Authority dated Jan. 10, 2012, 3 pages.

* cited by examiner

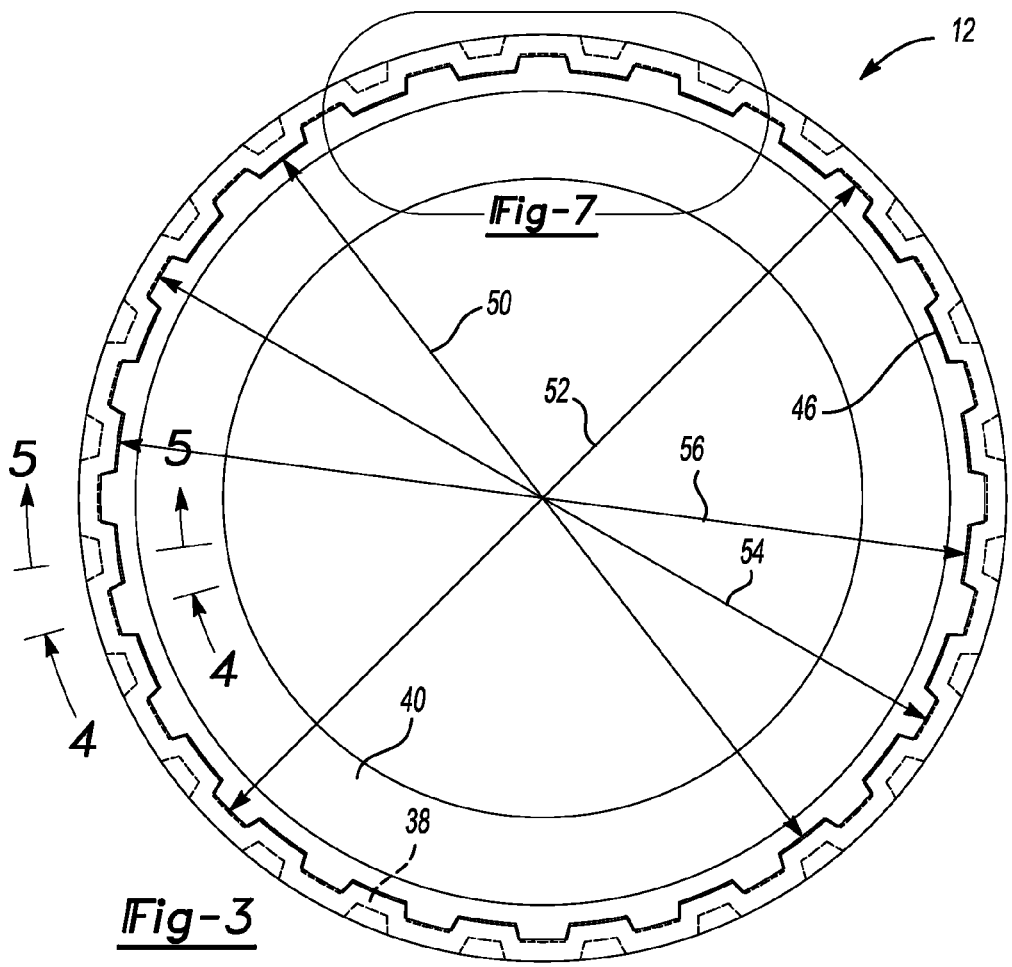
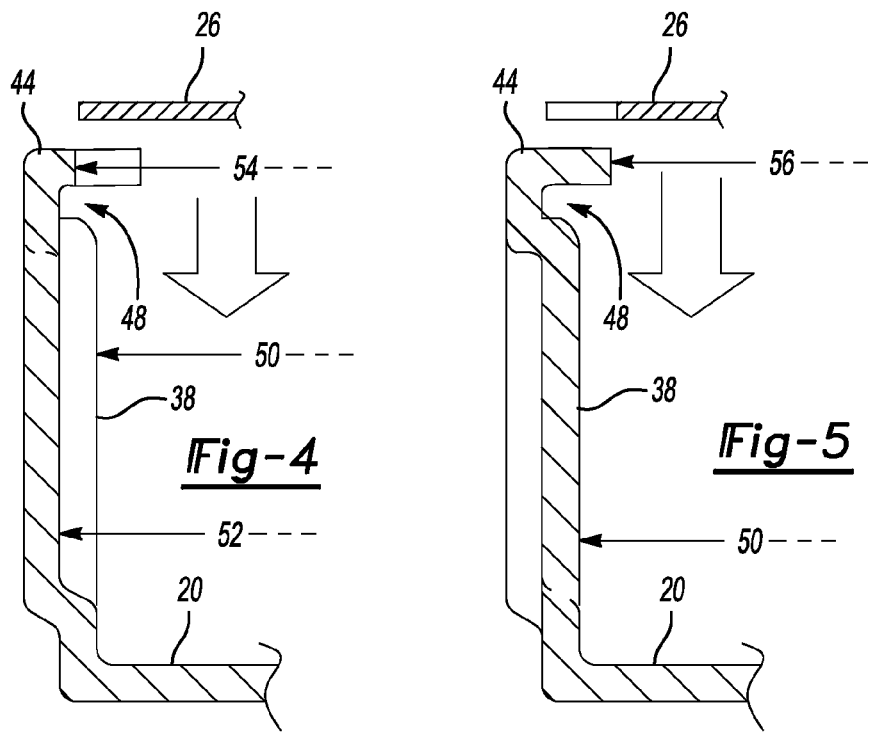

CLUTCH ASSEMBLY WITH FORMED RETENTION RING

BACKGROUND OF THE INVENTION

This application is a continuation of U.S. patent application Ser. No. 13/153,869 filed on Jun. 6, 2011 which is a U.S. non-provisional application which claims priority to U.S. Provisional Patent Application Ser. No. 61/351,311, filed Jun. 4, 2010 and incorporated herein by reference in its entirety. The present invention relates generally toward a clutch for use in an automotive transmission. More specifically, the present invention relates toward an improved clutch housing and retention assembly.

Clutches are known to be used in an automatic transmission assembled to a power train of a vehicle. An increased number of clutches assembled into a transmission are also known to improve mileage performance of a vehicle. For example, a transmission having only four clutches does not perform as well, or provide as good mileage performance, as a transmission having six, or even eight clutches. Due to the increasing cost of fuel, most vehicle companies are engineering new transmissions having eight and even nine clutches.

A typical clutch includes an annular housing having an annular wall defining a plurality of spaced splines. Occasionally, the splines are formed in the annular wall by machining a substantially thicker housing when additional structural integrity is required. Inside the clutch housing, a piston is retained adjacent a base of the housing and circumscribes a transmission shaft through which oil flows in between the housing base and the piston. The piston is separated from the plurality of clutch plates by a steel spacer.

The splines that are defined by the annular wall of the housing extend to the distal end of the housing. A snap ring groove is formed into the splines by either a machining or a reverse lance-and-form process. A snap ring is inserted into the groove to retain the clutch components set forth above. Clutches typically fail because the weakness of the reverse lance-and-formed groove formed into the splines of the clutch housing. Sharp edges defined by the reverse lance create weaknesses in the housing that are known to crack, particularly when the transmissions are under heavy load. Attempts have been made to improve the integrity of the snap ring groove and the clutch housing by increasing the thickness of the clutch housing and extending the distance between the snap ring groove and the open end of the housing. None of these attempts to improve the integrity of the housing have proven sufficient. Furthermore, increasing the thickness of the housing adds weight to the vehicle transmission, particularly given eight clutches are becoming more prevalent in some transmissions. Furthermore, extending the distance between the snap ring groove and the end of the clutch housing makes use of packaging space unnecessarily causing increase inside a transmission. Therefore, there is a strong need to redesign the clutch and the clutch housing to reduce mass, increase structural integrity, particularly to retain the snap ring, and reduce the amount of packaging space required for a given clutch.

SUMMARY OF THE INVENTION

A clutch assembly for a transmission, particularly for a vehicle transmission, includes a housing defined by a wall having an annular configuration circumscribing a clutch axis. The wall extends between an open end and a floor and the floor extends inwardly from the wall toward the clutch axis. A plurality of splines is formed in the wall and the splines are spaced from the open end of the housing. The snap ring retains a plurality of clutch plates and fibrous plates in the clutch housing. The open end of the wall is deformed inwardly toward the clutch axis at the open end of the housing defining a retainer for retaining the snap ring within the housing.

The inventive clutch and clutch housing eliminates the lance-and-form snap ring groove known to prior art clutch housings, which typically causes failure in an automotive transmission. The retainer of the present clutch housing is defined by deforming an annular wall of the housing radially inwardly to define the retainer between the upper end of the splines and the deform wall. In effect, the snap ring retention is achieved by "hemming" the top of the housing and results in a full 360° retention. This configuration of the snap ring retainer eliminates the weaknesses associated with the prior art lance-and-formed snap ring groove that are caused from forming a reverse lance cut in the plurality of splines formed in the clutch housing. This lance cut causes a stress rising condition resulting a release of the snap ring from the clutch housing. It is believed that the thickness of the clutch housing can now be reduced by upwards of 0.5 millimeters providing a 20% decrease in the mass of a typical housing. Furthermore, the splines no longer extend to the open end of the clutch housing, but are spaced from the open end of the housing to facilitate the deformation of the open end to form the retainer from the snap ring. This facilitates a reduction of the axial length of the clutch housing reducing the packaging space required of each clutch of the automotive transmission.

BRIEF DESCRIPTION OF THE DRAWINGS

The above, as well as other advantages of the present invention, will become readily apparent to those skilled in the art from the following detailed description of a preferred embodiment when considered in light of accompanying drawings in which:

FIG. 3 shows a plan view of the clutch housing of the present invention;

FIG. 4 is a sectional view of line 4-4 of FIG. 3 showing an installation of an individual clutch plate;

FIG. 5 is a sectional view of line 5-5 of FIG. 3 showing an installation of an individual clutch plate;

DETAILED DESCRIPTION OF THE INVENTION

Figure 1:
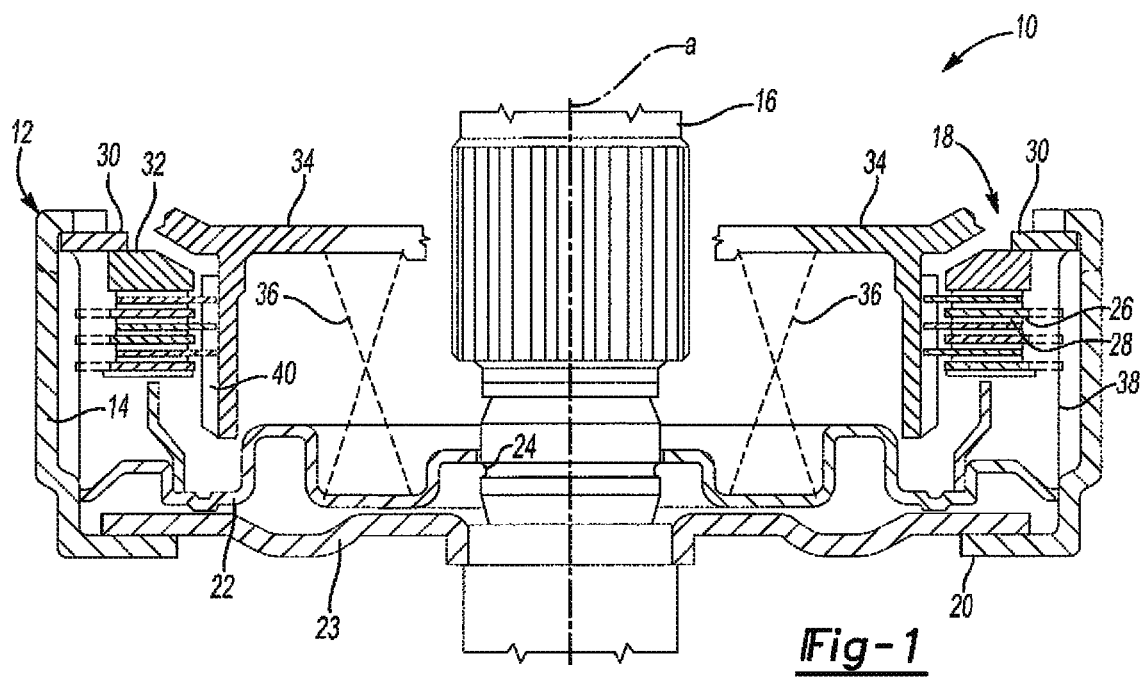
FIG. 1 shows a cross-sectional view of the clutch of the present invention.

Referring to FIG. 1, a side sectional view of the clutch assembly of the present invention is generally shown at 10. The assembly 10 includes a housing 12 defined by an annular wall 14. The annular wall 14 circumscribes a transmission shaft 16 that defines a shaft axis A. The annular wall 14 of the housing 12 extends axially between an open end 18 and a floor 20. The floor 20 extends radially inwardly toward the transmission shaft 16. A piston 22 circumscribes the transmission shaft 16 and is positioned adjacent the floor 20 of the housing 12. A seal 23 seals the floor 20 of the housing 12 to the transmission shaft 16. Transmission fluid pumps through the transmission shaft 16 through outlets 24 and to the space located between the piston 22 and the floor 20 of the housing 12 to shift the clutch assembly 10 in a known manner. A fibrous plate 28 circumscribes the transmission shaft 16 and is positioned in an abutting relationship between the piston 22 and a plurality of clutch plates 26. The clutch plates 26 are separated by fibrous plates 28. Clutch plates 26 and the fibrous plates 28 circumscribe the transmission shaft 16 and are retained in the housing 12 by snap ring 30 as will be explained further herein below. A clutch pressure plate 32 is disposed between the plurality of clutch plates 26, the fibrous plates 28, and the snap ring 30. A shift member 34 overlies the open end 18 of the housing 12 and provides biasing support to biasing member 36 for biasing the piston 22 toward the floor 20 of the housing 12.

Figure 2:
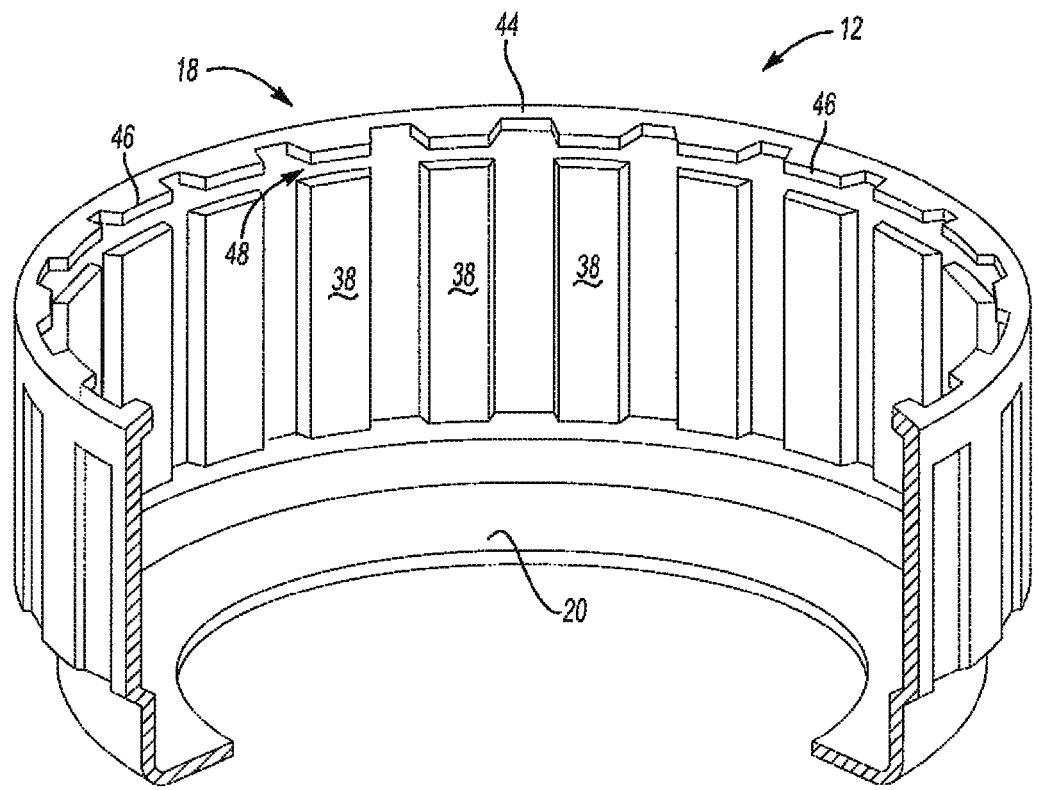
FIG. 2 shows a fragmented, perspective view of the clutch housing of FIG. 1.
Figure 6:
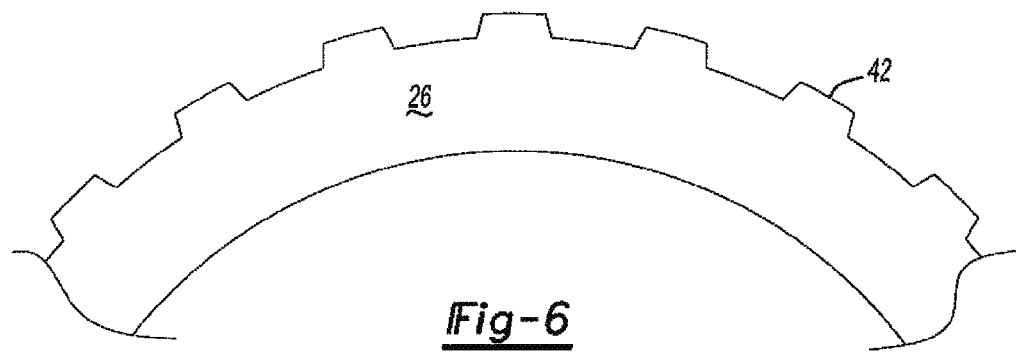
FIG. 6 shows a partial plan view of a clutch plate.

The housing 12 defines a plurality of housing splines 38 spaced around a full 360° of the housing 12 as best shown in FIG. 2. The shift member 34 defines a plurality of member splines 40 as seen in FIG. 1 so that the housing splines 38 and the member splines 40 are opposed enabling positioning of the clutch plates 26 engage either the housing splines 38 or the member splines 40 as shown in FIG. 1. Therefore, it should be understood by those of ordinary skill in the art that the clutch plates 26 define a plurality of spaced teeth 42 that engage the housing splines 38 in a gear-like manner. The teeth 42 of the clutch plates 26 are best represented in FIG. 6.

Referring now to FIG. 2, a retainer 44 is positioned at the open end 18 of the housing 12. The retainer 44 extends radially inwardly toward the transmission axis A and defines a plurality of retainer teeth 46. Each of the retainer teeth 46 is circumferentially aligned with one of the plurality of housing splines 38, the purpose of which will be explained further below. Each of the housing splines 38 are spaced from the open end 18 of the housing 12 so that a space 48 is defined between the retainer 44 and the housing splines 38. As shown in FIG. 1, a snap ring 30 is located in space 48 defined between the retainer 44 and the housing splines 38. Referring again to FIG. 2, the housing splines 38 are also spaced from the floor 20 of the housing 12. Although the housing splines 38 are represented as an inwardly projecting deformation in the annular wall 14 of the housing 12, it should be understood to those of ordinary skill in the art that the housing splines 38 may be formed by a cold formed process.

Referring now to FIGS. 3-5, the plurality of housing splines 38 define a minor housing diameter 50 of the housing 12 and the annular wall 14 of the housing 12 defines a major housing diameter 52. Likewise, the retainer 44 defines a major retainer diameter 54 between each of the retainer teeth 46 and a minor retainer diameter 56 defined by the radially inwardly-most portion of the retainer teeth 46. It is contemplated by the inventor that the major retainer diameter 54 includes a length that is between the minor housing diameter 50 and the major housing diameter 52. However, it is necessary that the major retainer diameter 54 is greater than the outer-most diameter of the teeth 42 on the clutch plates 26. Further, the minor retainer diameter 56 is contemplated to be proximate the minor housing diameter 50. However, the minor retainer diameter 56 should be no less than a minor diameter of the clutch plates 26.

The diameters as set forth above of the various elements of the housing 12, the retainer 44, and the retainer teeth 46 facilitate the installation of the clutch plates 26 into the housing 12.

Figure 7:
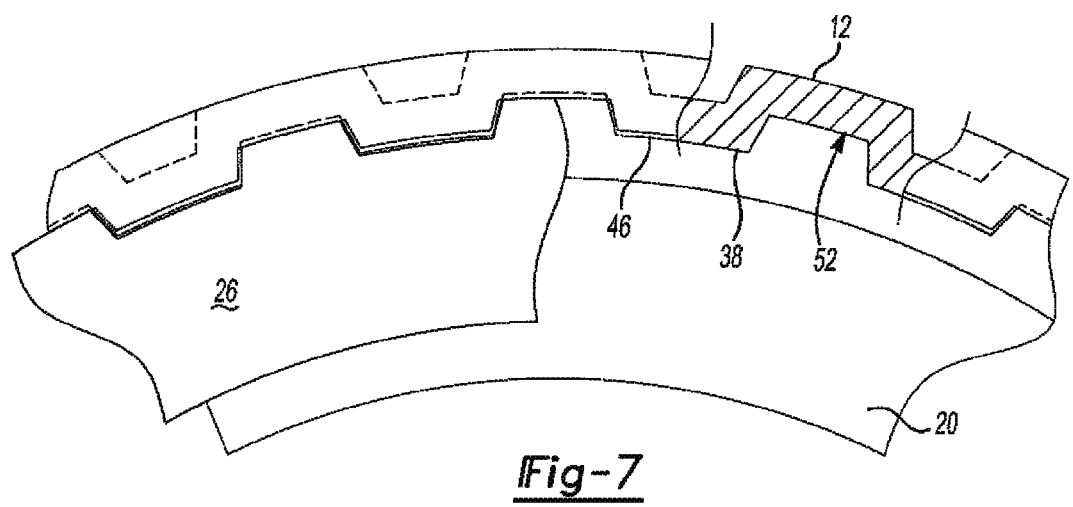
FIG. 7 shows a partial plan view of the inventive clutch assembly having a clutch plate installed.

FIG. 7 shows a partially assembled clutch assembly 10 where a clutch plate 26 is shown being received by the housing splines 38 and the retainer teeth 46. The clutch plate teeth 42 are shown spaced from the major housing diameter 52. It should be understood by those of ordinary skill in the art that the clutch plate teeth 42 need merely be receivable by the retainer 44 and be engagable with the housing splines 38 to be fully operable.

Figure 8:
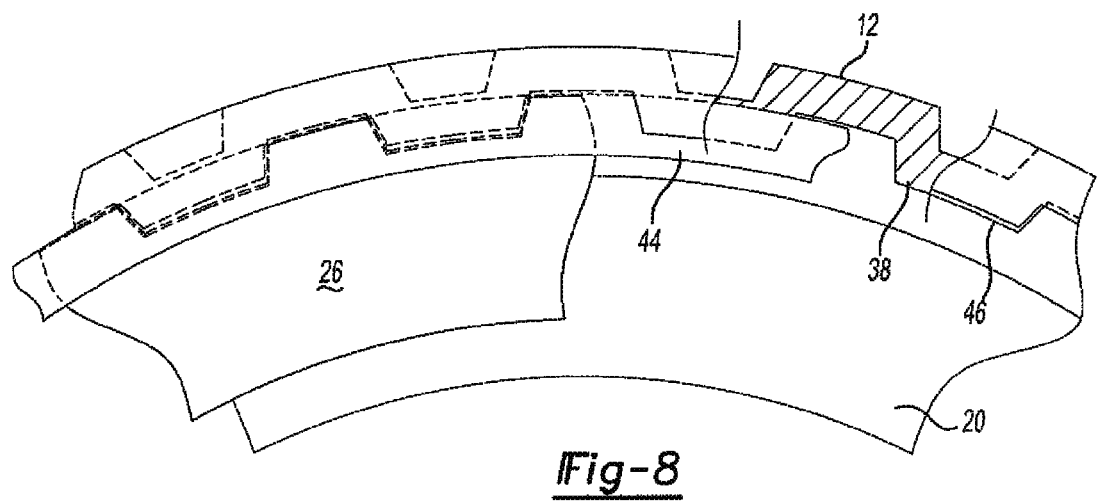
FIG. 8 shows a partial plan view of a clutch assembly having a clutch plate and a retention or snap ring installed.

FIG. 8 shows another view of a partially assembled clutch assembly 10 having the snap ring 30 retained by the retainer 44 and being positioned in the space 48 between the housing splines 38 and the retainer 44.

Figure 9:
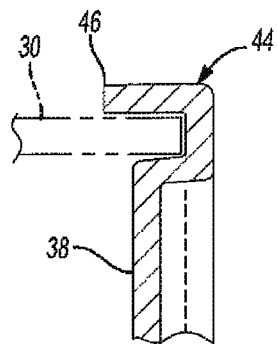
FIGS. 9 and 10 shows a sectional view of the retainer and retainer teeth with the snap ring installed.
Figure 10:
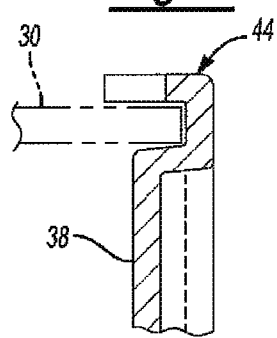

Referring to FIGS. 9 and 10, the snap ring 30 is shown positioned in the space 48 defined between the retainer 44 and the housing splines 38. It should be apparent by FIG. 10 that the snap ring 30 achieves 360° of contact and retention by the retainer 44. As set forth above, prior art snap ring grooves have only provided 180° of partial contact to the snap ring resulting in localized stresses developing on the prior art housing causing known failures. Additional structural integrity is shown in FIG. 9 where the retainer teeth 46 provide 180 degrees of further contact and retention to the snap ring 30. It is believed that a 20% reduction in the thickness of the sheet metal used to form the housing 12 is achievable by virtue of the increased contact between the retainer 44 and the snap ring 30 versus the current lance-and-form snap ring groove design.

Figure 11:
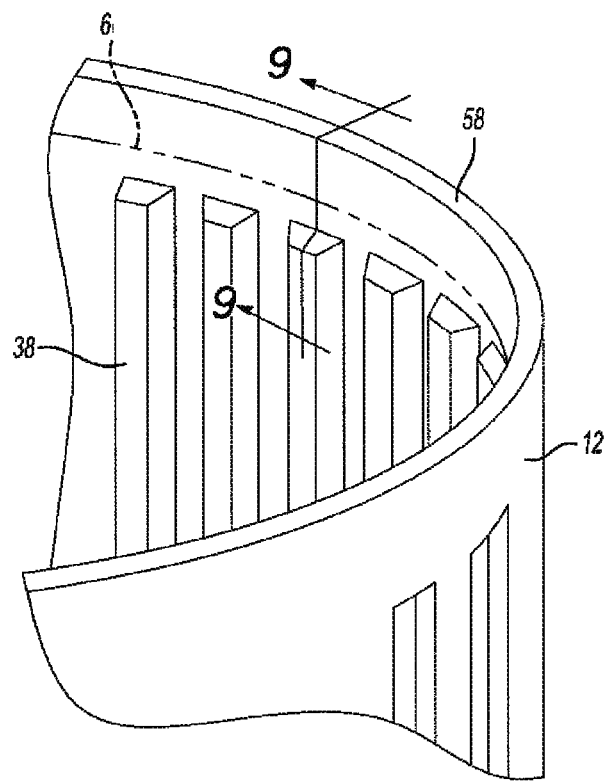
FIG. 11 shows a partial perspective view of the clutch housing prior to forming the retainer.
Figure 12:
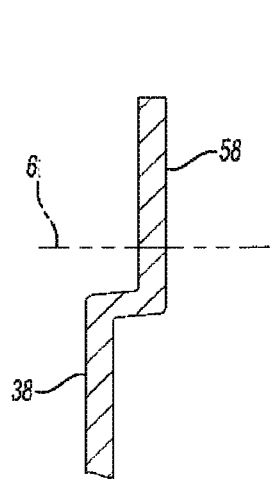
FIG. 12 shows a partial sectional view of the clutch housing prior to forming the retainer.
Figure 13:
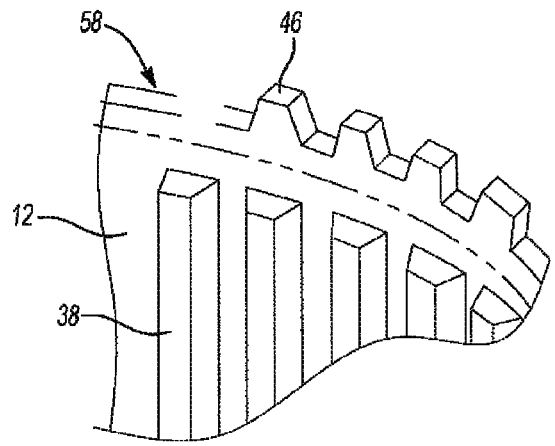
FIG. 13 shows a partial perspective view of the clutch housing having retention teeth formed prior to forming the retainer.

The method of forming the retainer will now be explained. Referring to FIG. 11, a partial cross-sectional view of the housing 12 is shown prior to formation of the retainer 44. Therefore, one of the plurality of housing splines 38 is shown having a diameter less than an upper flange 58 of the partially formed housing 12. It is obvious to one of ordinary skill in the art that the housing splines 38 are clearly spaced from an open end of the housing 12, even prior to full formation of the retainer 44. A fragmented line 6 shows the target hem of the flange 58 to define the retainer 44, and therefore the space 48, disposed between the retainer 44 and the plurality of housing splines 38. It should be noted that hem material thickness is constant of the parent incoming material thickness used on the entire clutch housing. However, prior to forming the housing flange 58, the housing flange 58 is slotted to define the retainer teeth 46, as best represented in FIG. 13. Once the retainer teeth 46 have been slotted into the flange, the retainer 44 is formed by a rolling or flow forming a process to define the space 48 disposed between the retainer 44 and the housing splines 38 as seen in FIGS. 9 and 10. It should be further understood by those of skill in the art, that the space 48 defined between the retainer 44 and the housing splines 38 is constant, while the snap ring 30 is selected from a plurality of thicknesses to accommodate assembling a variation of the clutch assembly 10. Therefore, it is believed the snap ring 30 will have some float within the space 48 defined by the retainer 44 and the housing splines 38 dependent upon the thickness of the snap ring 30 selected at the time of assembly.

Figure 14:
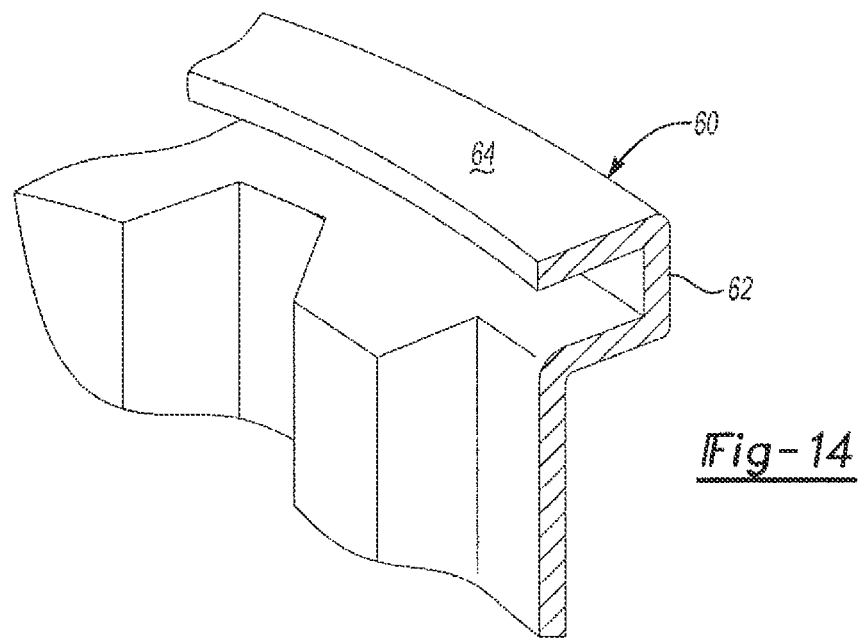
FIG. 14 shows a partial perspective view of an alternative clutch housing of the present invention.
Figure 15:
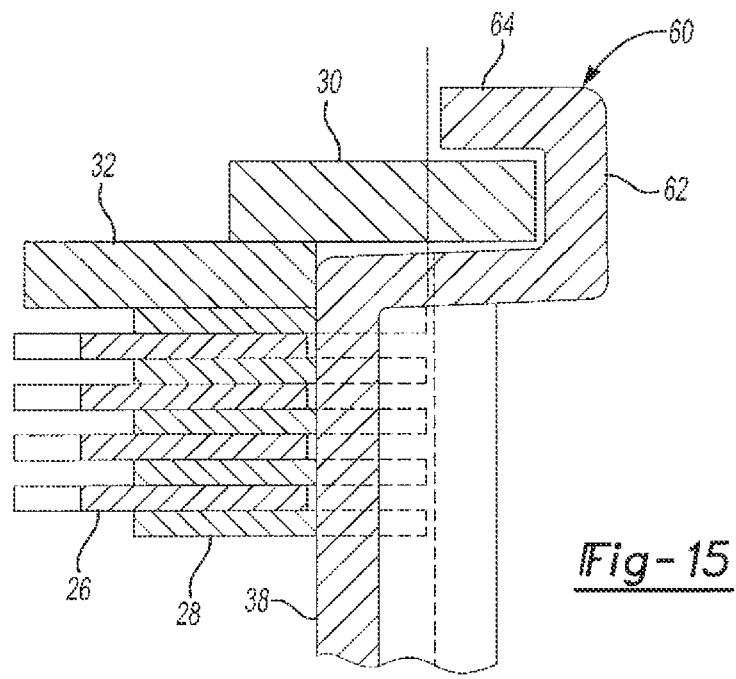
FIG. 15 shows a partial sectional view having a retainer ring and clutch plates installed into the alternative clutch housing.

An alternative retainer 60 is represented in FIGS. 14 and 15. Elements that are the same as those disclosed in the prior embodiment include the same element numbers. The alternative retainer 60 defines an outer retainer wall 62 having a diameter greater than the major housing diameter 52. In this embodiment, the alternative retainer 60 does not include retainer teeth, but provides a more extensive overlap with the snap ring 30, as is best represented in FIG. 15. In this embodiment, additional contact with the snap ring 30 is made by the retainer so that 360° of contact is achieved with a more substantial portion of the alternative retainer 60 by way of alternative retainer lip 64. As further represented in FIG. 15, snap ring 30 includes an outer diameter that is greater than the major housing diameter 52. However, snap ring 30 provides sufficient overlap with the pressure plate 32, the clutch plates 26, and the fibrous plates 28 to adequately retain the clutch assembly 10.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation while material to the teachings of the invention without departing from the essential scope thereof. Therefore, it is intended that the invention not be limited to the particular embodiment disclosed as the best mode contemplated for carrying out this invention but that the invention will include all embodiments falling within the scope of the appended claims.

What is claimed is:

1. A method of forming housing for use with a clutch assembly, comprises the steps of:
   forming an annular wall and a floor from a continuous sheet of metal, with said annular wall terminating at a flange disposed at an opposite end of said annular wall from said floor;
   forming a plurality of splines radially inwardly of said annular wall and said splines extending between said floor and said flange; and
   slotting said flange for defining a plurality of teeth in a distal end of said flange, then folding said flange radially inwardly forming a retainer defining a space between said retainer and said splines, with said teeth being circumferentially aligned with said splines formed in said annular wall securing a snap ring of the clutch assembly between said retainer and said splines.

2. The method set forth in claim 1, wherein said step of forming said splines is further defined by spacing said splines from an open end of said housing from said floor of said housing.

3. The method set forth in claim 1, wherein said step of folding said flange to form a retainer is further defined by identifying a target hem on said flange and folding said flange at said target hem.

4. The method set forth in claim 1, wherein said step of folding said flange is further defined by folding said flange radially inwardly of said annular wall.

5. The method set forth in claim 1, wherein said step of folding said flange is further defined by flow forming or roll forming said flange.

6. The method set forth in claim 1, wherein said step of forming said splines in said annular wall is further defined by deforming said annular wall radially inwardly to define splines having a minor spline diameter.

7. The method set forth in claim 6, wherein said step of folding said flange is further defined by folding said teeth inwardly of said annular wall terminating at a location spaced outwardly of said minor spline diameter.

8. The method set forth in claim 1, wherein said step of folding said flange is further defined by folding said flange prior to assembling said clutch assembly.

9. The method set forth in claim 1, wherein said step of slotting said flange to define a plurality of teeth is further defined by aligning said teeth in a same circumferential location on said annular wall as said splines.

10. The method set forth in claim 9, wherein said step of aligning said teeth in a same circumferential location on said annular wall as said splines is further defined by aligning said teeth in a same circumferential location on said annular wall prior to folding said flange to form a retainer defining a space between said retainer and said splines.

* * * * *